US007031761B2

(12) United States Patent
Hunt et al.

(10) Patent No.: US 7,031,761 B2
(45) Date of Patent: Apr. 18, 2006

(54) CELLULAR RADIO TELEPHONE

(75) Inventors: Lisa Hunt, Buckinghamshire (GB); Simon Furmidge, Surrey (GB); Mark Hutchison, Hampshire (GB); Peter Ashall, Berkshire (GB); Nigel Cridland, Hampshire (GB)

(73) Assignee: Vertu Limited, London (GB)

(*) Notice: Subject to any disclaimer, the term of this patent is extended or adjusted under 35 U.S.C. 154(b) by 251 days.

(21) Appl. No.: 10/656,402

(22) Filed: Sep. 4, 2003

(65) Prior Publication Data

US 2005/0101260 A1 May 12, 2005

Related U.S. Application Data

(60) Provisional application No. 60/409,260, filed on Sep. 9, 2002.

(51) Int. Cl.
*H04M 1/00* (2006.01)

(52) U.S. Cl. .............................. 455/575.2; 455/575.1; 455/575.6; 455/89; 455/90.3; 455/84; 455/347; 455/575.8

(58) Field of Classification Search ............ 455/575.1, 455/575.2, 575.6, 90.3, 347, 89, 84, 575.8, 455/90.1

See application file for complete search history.

(56) References Cited

U.S. PATENT DOCUMENTS

| | | | | |
|---|---|---|---|---|
| 5,590,417 | A * | 12/1996 | Rydbeck | 455/575.2 |
| 5,983,100 | A * | 11/1999 | Johansson et al. | 455/426.1 |
| 6,078,825 | A * | 6/2000 | Hahn et al. | 455/569.2 |
| 2003/0162536 | A1* | 8/2003 | Panico | 455/422 |
| 2003/0211871 | A1* | 11/2003 | Nassimi | 455/575.1 |
| 2005/0064896 | A1* | 3/2005 | Rautiola et al. | 455/553.1 |

FOREIGN PATENT DOCUMENTS

| | | | |
|---|---|---|---|
| EP | 0840465 | A2 | 5/1998 |
| WO | WO-94/29966 | A1 | 12/1994 |
| WO | WO-00/56051 | A1 | 9/2000 |
| WO | WO-00/62431 | A1 | 10/2000 |
| WO | WO-02/054718 | A2 | 7/2002 |
| WO | WO-02/054726 | A1 | 7/2002 |

* cited by examiner

*Primary Examiner*—Sonny Trinh
*Assistant Examiner*—Khai Nguyen
(74) *Attorney, Agent, or Firm*—Harrington & Smith, LLP

(57) ABSTRACT

A two part cellular radio telephone in which a separable part is charged from a cellular transceiver portion.

2 Claims, 3 Drawing Sheets

CELLULAR RADIO TELEPHONE

CROSS-REFERENCE TO RELATED APPLICATION

This application claims the benefit under 35 U.S.C. 119(e) of U.S. Provisional Patent Application No. 60/409,260 filed Sep. 9, 2002.

FIELD OF THE INVENTION

The present invention relates to a cellular radio telephone. In particular, embodiments relate to ornamental cellular radio telephones.

BACKGROUND OF THE INVENTION

A present mobile telephones are generally manufactured as specific models. The model has a standard appearance and functionality and the user is unable to customise the appearance or functionality at the point of manufacture.

There has therefore been a trend to accessorise mobile telephones at or after the point of sale so that they have an individual appearance and the required functionality. The accessories are designed for a mass market and are generally made as cheaply as possible while conforming to quality standards. User replaceable covers are one example of a popular accessory which is used to vary the appearance of the standard model of mobile telephone and personalise it. Headsets are one example of an accessory which are used to vary the function of the standard model of mobile telephone by providing for 'hands-free' use. Until recently the headsets have been physically connected to the mobile telephone by a lead which provided power and data channels. However, Bluetooth (trademark) technology now provides for wireless headsets. Although this technology provides the required data channels it does not provide power to the headset which has its own battery and its own charging transformer.

There has been a recent change in the mobile telephone market lead by Vertu. Vertu provide ornamental mobile telephones which are customisable to a user's specification at manufacture. This obviates the need for ornamental accessories such as replacement covers at or after the point of sale.

It would be desirable to reduce further the need for accessories at or after the point of sale.

SUMMARY OF THE INVENTION

According to one aspect of the present invention there is provided a cellular radio telephone having an audio input device and an audio output device with which a user can communicate in a cellular radio telephone network, comprising:

- a cellular transceiver portion comprising cellular radio transceiver circuitry for communicating in the cellular radio telephone network and a first low power wireless transceiver; and
- a user input/output portion comprising the audio input device and the audio output device and a second low power wireless transceiver for communicating with the first low power wireless transceiver of the cellular transceiver portion, wherein the first and second low power wireless transceivers enable a user to communicate using the audio input and output devices in the cellular radio telephone network when the cellular transceiver portion and the user input/output portion are physically separated and wherein the user input/output portion is electrically charged via the cellular transceiver portion.

Thus the removable input/output portion for the mobile telephone is ingeniously designed in at manufacture and the need for separate charging transformers for the separate portions is avoided.

According to another aspect of the present invention there is provided a cellular radio telephone having an audio input device and an audio output device with which a user can communicate in a cellular radio telephone network, comprising: a cellular transceiver portion comprising at least cellular radio transceiver circuitry for communicating in the cellular radio telephone network and a first low power wireless transceiver; and a user input/output portion comprising at least the audio input device and the audio output device, and a second low power wireless transceiver for communicating with the first low power wireless transceiver of the cellular transceiver portion, wherein the cellular radio telephone has a first configuration in which the cellular transceiver portion and the user input/output portion are physically separated but the first and second low power wireless transceivers enable a user to communicate using the audio input and output devices in the cellular radio telephone network and a second configuration in which the user input/output portion has been electrically connected to the cellular transceiver portion by the user.

BRIEF DESCRIPTION OF THE DRAWINGS

For a better understanding of the present invention and to understand how the same may be brought into effect reference will now be made, by way of example only, to embodiments of the invention illustrated in the accompanying drawings, in which.

DETAILED DESCRIPTION OF THE INVENTION

Figure 1:
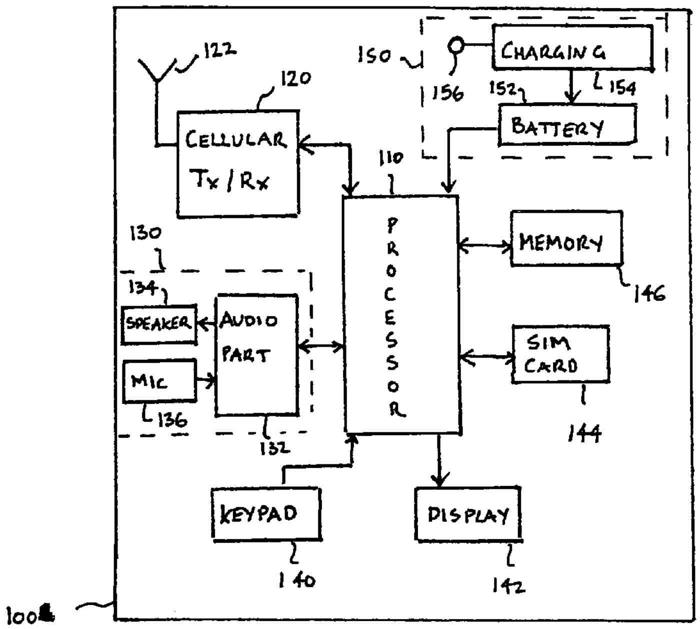
FIG. 1 illustrates a prior art cellular radio telephone.

FIG. 1 is a schematic illustration of a currently available mobile cellular telephone 100. The mobile cellular telephone 100 comprises a processor 110 for controlling the operation of the telephone 100. The processor 110 is electrically connected to cellular radio transceiver circuitry 120. The cellular radio transceiver circuitry 120 uses an antenna 122 to transmit and receive in a cellular radio communications network. The processor 110 is electrically connected to an audio input/output section 130, which allows a user to have a two-way conversation using the cellular telephone 100. The audio input/output section 130 comprises an audio processing circuit 132 electrically connected to the processor, a speaker 134, for audio output, electrically connected to the audio processing circuit 132 and a microphone 136, for audio input, electrically connected to the audio processing circuit 132. A keypad 140 for user input, a display 142 for visible output to a user, a SIM card 144 and a memory 146 are each electrically connected to the processor 110. A power supply circuit 150 provides electrical power to the processor 110 and those other circuits in the cellular telephone 100 that draw power. The power supply circuit 150 comprises a battery 152 for storing and supplying the power. Charging circuitry 154 is connected between the battery 152 and an interface 156, on the exterior of the cellular telephone 100. When the interface 156 is connected to an electrical transformer the charging circuitry 154 charges the battery 152. Although a GSM compliant cellular telephone 100 is illustrated which therefore has a SIM card 144, the SIM card 144 may be absent from cellular telephones 100 for other cellular communication standards.

Figure 2:
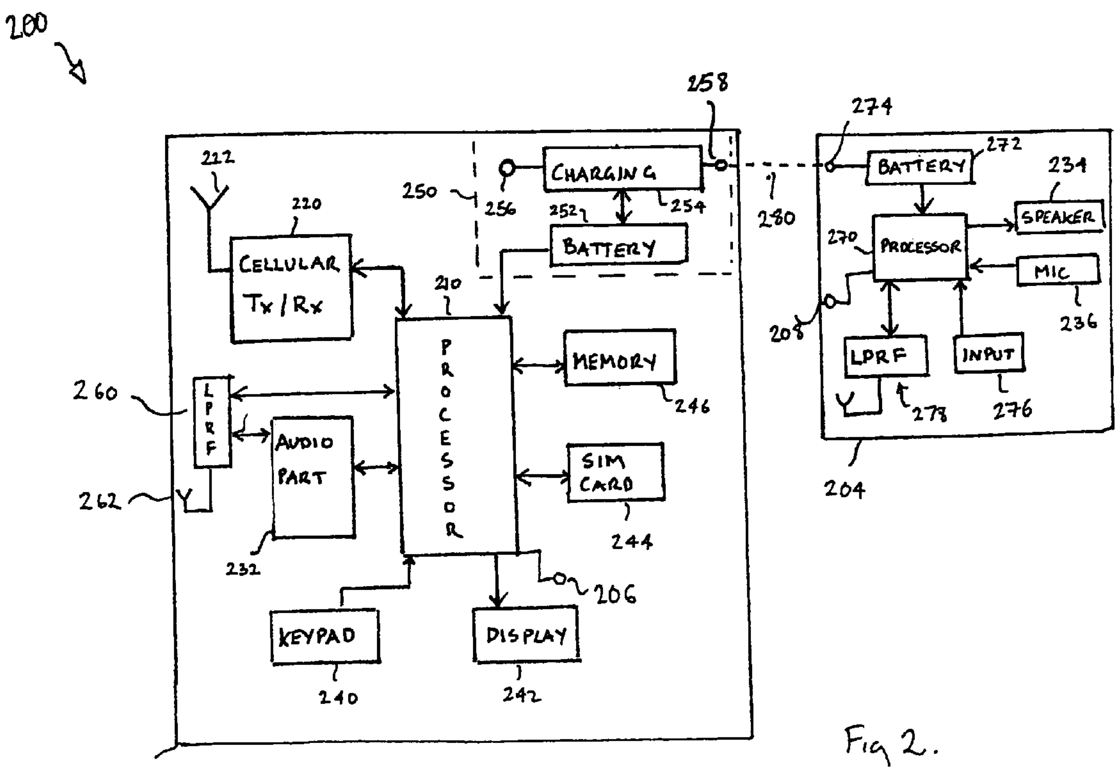
FIG. 2 is a schematic illustration of a cellular radio telephone according to a first embodiment of the invention.

FIG. 2 is a schematic illustration of an embodiment of the present invention. A mobile cellular telephone 200 comprises a cellular transceiver portion 202 and a physically separate and distinct user input/output portion 204.

The cellular transceiver portion 202 comprises a processor 210 for controlling the operation of the telephone 200. The processor 210 is electrically connected to cellular radio transceiver circuitry 220. The cellular radio transceiver circuitry 220 uses an antenna 222 to transmit and receive in a cellular radio communications network. A keypad 240 for user input, a display 242 for visible output to a user, a SIM card 244 and a memory 246 are each electrically connected to the processor 210. Although a GSM compliant cellular telephone 200 is illustrated, which therefore has a SIM card 244, the SIM card 244 may be absent from cellular telephones 200 for other cellular communication standards. A power supply circuit 250 provides electrical power to the processor 210 and those other circuits in the cellular transceiver portion 202 that draw power. The power supply circuit 250 comprises a battery 252 for storing and supplying the power. Charging circuitry 254 is connected between the battery 252 and an interface 256, on the exterior of the cellular transceiver portion 202. When the interface 256 is connected to an electrical transformer the charging circuitry 254 charges the battery 252. The charging circuitry 254 additionally has a connector 258 for physically connecting with a corresponding connector 274 of the user input/output portion 204 for charging a battery 272 in the user input/output portion 204. The charging circuitry 254 charges the battery 272 of the user input/output portion 204 preferably using electricity supplied via the interface 256, if possible, but if a transformer is not connected, the electricity may be provided from the battery 252 which has a greater capacity than battery 272. In other implementations, the connectors 258 and 274 do not make physical galvanic contact and charging occurs indirectly via inductive or capacitative coupling.

The processor 210 is also electrically connected to a low power radio frequency transceiver (LPRF) circuit 260, directly and indirectly (via an audio processing circuit 232). The LPRF circuit 260 communicates via antenna 262 with a corresponding low power radio frequency circuit 278 in the user input/output portion 204. The LPRF circuits 260 and 272 preferably communicate according to the Bluetooth (trademark) communication standard which allows communication over a range of a few metres.

The cellular transceiver portion 202 does not have a speaker or a microphone. The audio processing circuit 232 is indirectly connected to a microphone 236 and speaker 234, housed in the user input/output portion 204, via a communication channel formed between the LPRF circuits 260 and 272.

The user input/output portion 204 comprises a processor 270 which is electrically connected to LPRF circuitry 278, microphone 236, speaker 234 and battery 272. The battery 272 is also electrically connected to connector 274, which is on the exterior of the user input/output portion 204 and is designed to physically connect, automatically, with the corresponding connector 258 of the cellular transceiver part 202.

The user input/output portion 204 operates as a handset to the cellular telephone 200. It provides the audio input and output during a telephone call by communicating with the cellular transceiver portion 202, when it is separated from it, using the LPRF circuits 278 and 260.

The user input/output portion 204 may additionally comprise a simple input/output device 276. If it does, it is electrically connected to the processor 270. The input/output device may have a visible indicator such as a light for alerting the user to an incoming call or to indicate when a call is in progress. It may also have a mechanism for inputting a control signal, which is transmitted to the processor 210 via the LPRF circuits 278 and 260. This control mechanism may be used to effect different control depending upon the state of the cellular telephone 110. For example, if there is an incoming call an actuation will answer the call, if a call is on-going a single actuation will disable the microphone 236 and an extended actuation will end the call, and if the telephone is idle an actuation will activate voice dialling.

The cellular transceiver portion 202 may additionally have a connector 206 electrically connected to the processor 210 and the user input/output portion 204 may additionally have a corresponding connector 208 electrically connected to the processor 270. The corresponding connectors 206, 208 connect when the user input/output portion 204 is physically attached to or housed with the cellular transceiver portion 202. This allows the processors 270 and 210 to communicate directly instead of via the LPRF circuits 260 and 278 when the user input/output portion 204 and the cellular transceiver portion are attached or housed together.

The cellular transceiver portion 202 is portable, preferably hand-portable. The user input/output portion 204 is hand-portable.

The cellular transceiver portion 202 may be housed in a casing with apertures for the keypad 240, display 242, interface 256, connector 258 and connector 206. The casing is, in turn, housed in a wallet, belt or handbag.

According to one embodiment there is a fixed number of different styles of ornamental casing for housing the cellular transceiver portion 202 and the user may select a preferred one of the fixed styles.

According to another embodiment, the casing for the cellular transceiver portion 202 may be customised according to a user's specification at manufacturer so that the telephone, when delivered to the user, has ornamentation specific to the user's taste.

The user input/output portion 204 is preferably contained in an ornamental housing which is customised at manufacture to a user's specification.

Thus a user may own one or more cellular transceiver portions 202 and own one or more user input/output devices, each of which is contained in an ornamental housing. The user may then 'make' a cellular telephone by selecting any one of the plurality of customised input/output devices 204 for use with any one of the plurality of cellular transceiver portions 202.

Figure 3:
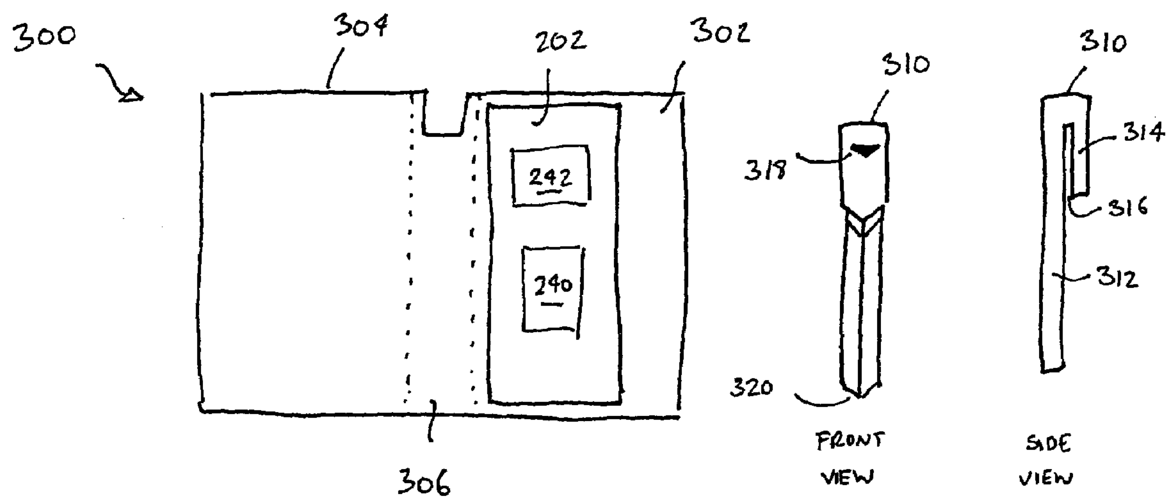
FIG. 3 illustrates one implementation of the first embodiment.

FIG. 3 illustrates an embodiment of the inventive cellular telephone 200 in which the cellular transceiver portion 202 (contained within a casing) is housed in a wallet 300 and the user input/output portion is housed in a stylus-like device 310.

The wallet 300 comprises a rigid back portion 302, a rigid front portion 304 and a flexible connecting portion 306 which joins the front and back portions 302, 304 together. The cellular transceiver portion's casing is attached to the back portion 302 of the wallet 300. When the wallet is open the front and back portions 302, 304 lie in the same plane and the casing of the cellular transceiver portion 202 is exposed to view. When the wallet is closed the front portion 304 overlies the back portion 302 and the cellular transceiver portion 202 is covered by the front portion 304.

The stylus 310 is illustrated with a front perspective view and a side perspective view simultaneously in the Figure. The stylus 310 has an elongate body portion 312 and an integrated clip 314 which extends from one end of the body portion part way along the length of the body portion 312. The clip 314 has an unexposed surface which opposes the body portion. There is a gap 316 between the unexposed surface of the clip 314 and the body portion 312. The clip also has an exposed surface. The exposed surface has a 'V' shaped device which has an aperture 318 in it. The aperture 318 forms a port to the speaker 234. The body portion 312 has an aperture 320 at the other end to where the clip joins. The aperture 320 is a port to the microphone 236. The positioning of the port to the speaker 234 in the clip allows it to be quickly and accurately located and correctly positioned adjacent a user's ear. The aperture 320 may be positioned on a bottom face or a side face of the stylus 310. The stylus 310 may additionally comprise a user extendible slide portion. The slide portion can be extended when the stylus 310 is being used to port sound or to improve the porting of sound to the microphone 236.

If the casing is customisable, it can be assembled from a large number of elements respective ones of which have characteristics selected by a commissioning party. Likewise, the user input/device is customisable, and it can be assembled from a large number of elements respective ones of which have characteristics selected by a commissioning party. The characteristics of individual elements may be selected from a set of available options or individually commissioned. An element's characteristic may take the form of amongst other things, the choice of material of an element and the surface decoration of an element. A surface decoration may be an encrustation, a veneer, an image, a colour or an engraving, for example. The materials from which selection can be made have superior texture and/or appearance and/or value. The materials used may be: precious and semi-precious gemstones, jewels and minerals; metals, including gold (18 carat white gold and 18 carat gold), silver, platinum, titanium, aluminium and alloys such as steel; ceramics in their various forms (particularly for the use in the rear of the casing); skins such as leather (for part of the casing); wood.

The display 242 may be made from sapphire or other precious/semi-precious stones, glass or other minerals. Individual elements or portions of the casing may be customised with surface decoration that could include veneers of desired materials on plastic or other sub-frames. The elements could have instead, or in addition, surface texture provided by a particular finish or engraving or encrustation with gems or other stones or materials, such as sapphires, rubies, emeralds, diamonds or the like. The keys of the keypad 240 may have ruby bearings. The keys themselves may be made of one metal or alloy, such as steel, but tipped with precious metal such as gold.

The characteristics of respective ones of the plurality of casing elements are selected prior to manufacture, which increases the degree to which customisation is available and obviates the need for ornamental customisation at or after the point of sale. The cellular transceiver portion 202, housed within the casing, may be removed and replaced, possibly by a user. This allows the cellular telephone to be updated in functionality without disposing of the valuable casing. Thus, the customised casing which may have a high monetary and/or sentimental value will be retained and will be reusable with other cellular transceiver portions 202.

The wallet 300 may be made from different types of skins, leathers, carbon fibre or similar materials. The wallet will have some structure within it, probably plastic, for receiving the stylus 310 as a spine.

The simple input/output device 276, if present, may comprise a visible indicator such as a light. This is preferably provided by the illumination of a precious gemstone.

The simple input/output device 276, if present, may have a mechanism for inputting a control signal. The input mechanism may be provided by a switch that is actuated by pressing the clip 314 toward the body portion 312 or by providing two parts to the body portion 312 where relative motion between the two parts is sensed and used as the input mechanism.

The stylus 310 is usable as the user input/output portion 204 of the cellular telephone 200, when it is physically separated from the wallet 300. The stylus 310 can be held between the index finger and thumb of one hand. When it is not in use, the stylus 310 is attached to the wallet 300. The clip 314 is used to attach the stylus 310 to the flexible portion 306 of the wallet 300. The flexible portion 306 enters the gap 316 and is gripped between the body portion 312 and the unexposed surface of the clip 314. The clip is preferably resiliently flexible, but stiff. In this configuration, with the stylus 310 attached to the wallet 300, the stylus is housed in the wallet and forms an integral structural part of the wallet 300. It functions as a spine to the wallet and ensures that when the wallet is closed, it closes correctly with the front portion 304 correctly overlying the back portion 302. In the closed configuration, the clip 314, and therefore the speaker port, is exposed on the exterior of the closed wallet 300 and thus an audible signal from the speaker 234 indicating an incoming call can be easily heard. The stylus 310 is usable as the user input/output portion 204 of the cellular telephone 200, when it is attached to the wallet 300. The entire wallet may be used as a cellular telephone 200 with the entire wallet being held up to a user's ear and mouth for communication during a telephone call.

The unexposed surface of the clip 314 carries connector 274. The flexible portion 306 of the wallet 300 has the corresponding contact 258. The connectors 274 and 258 are automatically brought into physical contact and form a connection when the stylus 310 is clipped to the wallet 300.

The unexposed surface of the clip 314 may also carry connector 208 (if present). The flexible portion 306 of the wallet 300 would have a corresponding contact 206. The connectors 206 and 208 are automatically brought into physical contact and form a connection when the stylus 310 is clipped to the wallet 300.

The cellular telephone 200 may optionally have an additional speaker and an additional microphone connected to audio processing circuit 232 in the cellular transceiver portion 202. The speaker and microphone in the cellular transceiver portion 202 may be suitable for hands/free use Thus in this embodiment, the stylus 310 is not the sole or only means of audio input and output for the cellular telephone 200. There may be a user operable switch preferably provided via a displayed menu that allows the user to choose between whether the speakers and microphone combination of the stylus 310 or the speaker and microphone combination of the cellular transceiver portion 202 is enabled. Thus the user may select whether the telephone operates with the speaker and microphone combination 234, 236 or with the transceiver portion's additional speaker and microphone combination. The user may select that the speaker and microphone combination are used when possible i.e. as a default, when the cellular transceiver portion 202 and the stylus portion 204 are separated. However, there is preferably a detection mechanism that detects when the stylus portion 204 and transceiver portion 202 are physically separated but are unable to communicate with each other via the LPRF circuits 260, 278. If such communication is not possible, the detection mechanism automatically allows the additional microphone and speaker combination of the cellular transceiver portion 202 to be used.

Figure 4:
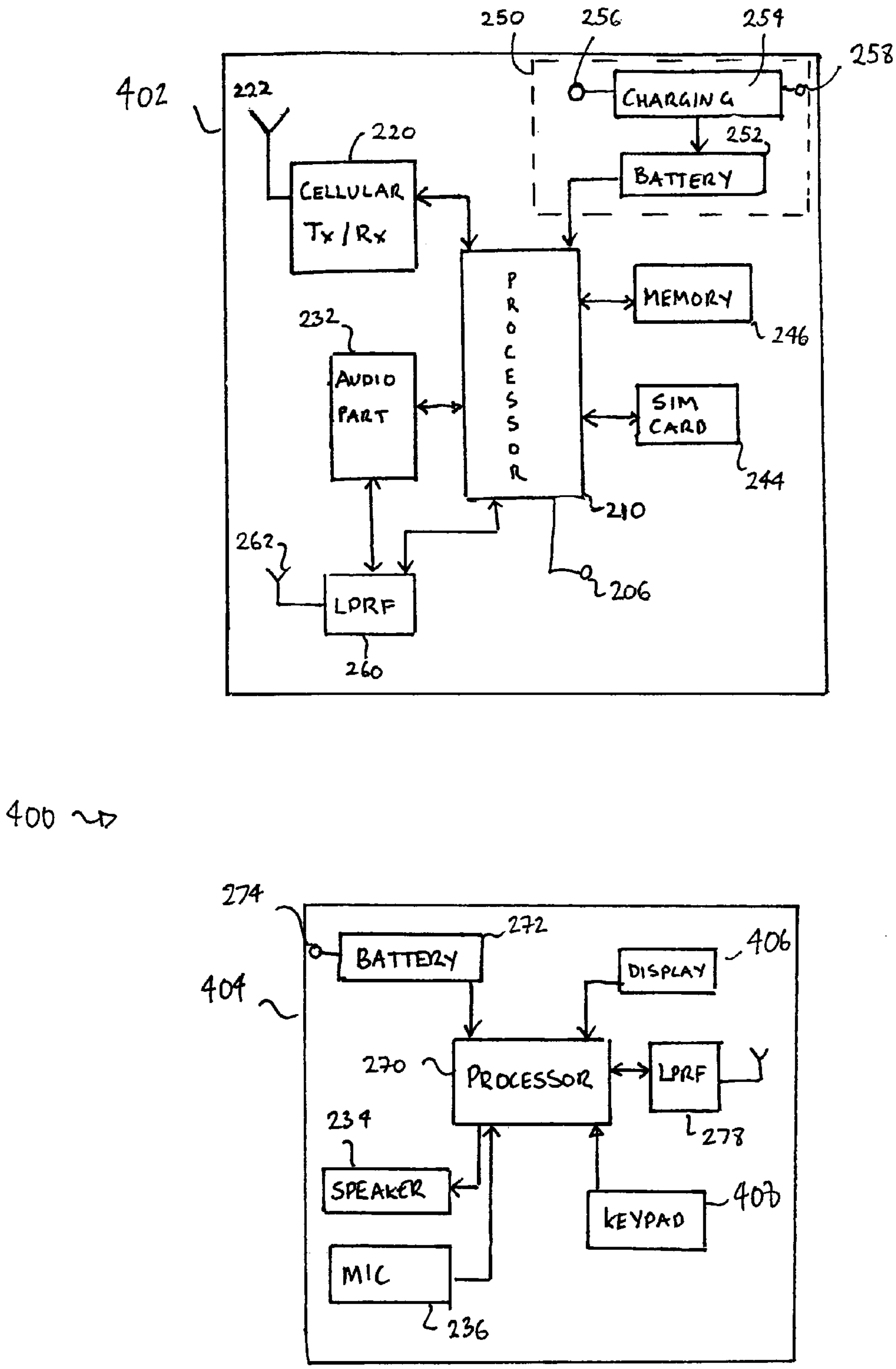
FIG. 4 is a schematic illustration of a cellular radio telephone according to a second embodiment of the invention.

FIG. 4 is a schematic illustration of another embodiment of the present invention. A mobile cellular telephone 400 comprises a cellular transceiver portion 402 and a physically separate and distinct user input/output portion 404. The mobile cellular telephone 400 illustrated in FIG. 4, differs from the mobile cellular telephone 200 illustrated in FIG. 2, in that the user input/output portion 404 has the display 406 and the keypad 408 of the telephone 400 instead of the cellular transceiver portion 402. The operation of the cellular mobile telephone 400 and the inter operation of the user input/output portion and cellular transceiver portion are otherwise identical to the cellular mobile telephone 200.

The cellular transceiver portion 404 comprises: a processor 210, cellular radio transceiver circuitry 220, antenna 222, a SIM card 244 (if a GSM telephone), a low power radio frequency transceiver (LPRF) circuit 260 with antenna 262, an audio processing circuit 232, a memory 246, a connector 206 (optional) and a power supply circuit 250 including a battery 252, charging circuitry 254, an external interface 256 and a connector 258. These components operate together as described in relation to FIG. 2.

The user input/output portion 404 comprises a processor 270, LPRF circuitry 278, microphone 236, speaker 234, battery 272 and a connector 208 (optional) which operate together as previously described in relation to FIG. 2. The user input/output portion 204 additionally comprises a display 406 and keypad 408.

The cellular transceiver portion 404 does not have a speaker, a microphone, a display or a keypad. The audio processing circuit 232 is indirectly connected to a microphone 236 and speaker 234, housed in the user input/output portion 204, via a communication channel formed between the LPRF circuits 260 and 272. The processor 210 is indirectly connected to display 406 and keypad 408, housed in the user input/output portion 204, via a communication channel formed between the LPRF circuits 260 and 272.

The user input/output portion 402 operates as a handset to the cellular telephone 400 by communicating with the cellular transceiver portion 402, when it is separated from it, using the LPRF circuits 278 and 260. The user input/output portion 402 provides the only audio input and output of the telephone 400. The user input/output portion 402 provides, via the keypad 408, for user control of the telephone 400. The user input/output portion 402 provides, via the display 406, visual output to a user.

The user interface provided by the keypad 408 in the user input/output portion 404 enables a user to dial a telephone number, retrieve a telephone number from a phone book stored in memory 246 and to display the telephone number on the display 406 and to do other actions which can be carried out by the keypad 140 and 240 of FIGS. 1 and 2.

The display 406 may be a single line display or a multiple line display.

The cellular transceiver portion 402 is portable. preferably hand-portable. The user input/output portion 404 is hand-portable.

The cellular transceiver portion 402 may be housed in a casing with apertures for the keypad, display, interface 256, connector 258 and connector 206. The casing is, in turn, housed in a wallet, belt or handbag.

According to one embodiment there is a fixed number of different styles of ornamental casings for casing of the cellular transceiver portion 402 and the user may select a preferred one of the fixed styles.

According to another embodiment, the casing for the cellular transceiver portion 402 may be customised according to a user's specification at manufacture so that the telephone, when delivered to the user, has ornamentation specific to a user's taste. The customisation may be as described with reference to FIG. 3.

The user input/output portion 404 is preferably contained in an ornamental housing which is customised at manufacture to a user's specification. The customisation may be as described with reference to FIG. 3.

Thus a user may own one or more cellular transceiver portions 402 and own one or more user input/output devices 404, each of which is contained in an ornamental housing. The user may then 'make' a cellular telephone by selecting any one of the plurality of customised input/output devices 404 for use with anyone of the plurality of cellular transceiver portions 402.

Figure 5:
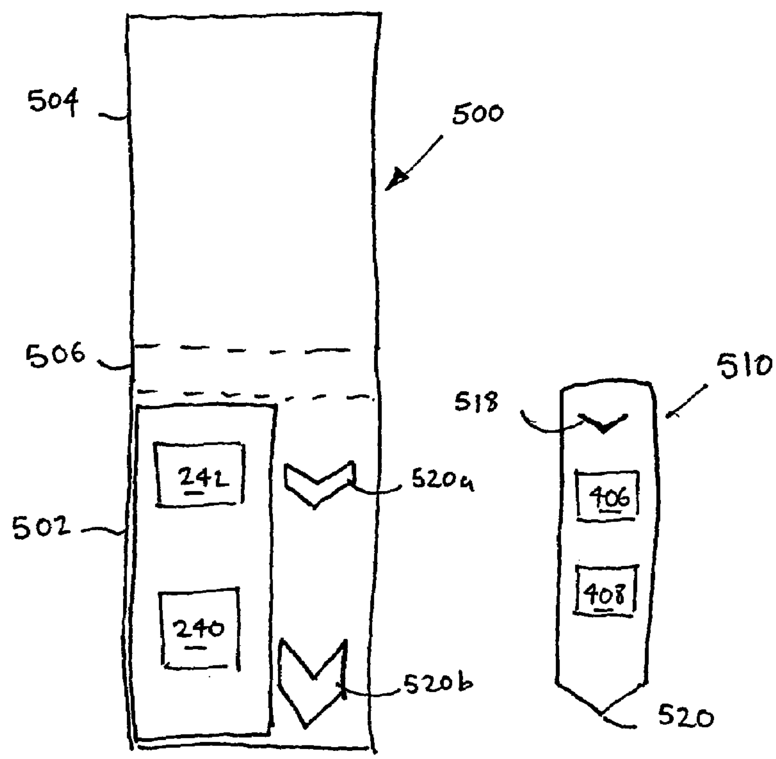
FIG. 5 illustrates one implementation of the second embodiment.

FIG. 5 illustrates an embodiment of the inventive cellular telephone 400 in which the cellular transceiver portion 402 is housed in a wallet and the user input/output portion 404 is housed in a handset.

The wallet 500 comprises a rigid back portion 502, a rigid front portion 504 and a flexible connecting portion 506 which joins the front and back portions 502, 504 together. The cellular transceiver portion 402 of the cellular telephone 400 is attached to the front face of the back portion 502 of the wallet 500. When the wallet is open the front and back portions 504, 502 lie in the same plane and the cellular transceiver portion 402 is exposed to view. When the wallet is closed the front portion 504 overlies the back portion 502 and the cellular transceiver portion 402 is covered by the front portion 504.

The handset 510 is illustrated with a front perspective view. The handset 510 has an elongate body portion with a front face. The keypad 408 and display 406 are integrated into the front face. The front face, towards one end, has a V shaped device which has an aperture 518 in it. The aperture 518 forms a port to the speaker 234. The body portion has an aperture 520 at the other end. The aperture 520 is a port to the microphone 236. The positioning of the port to the speaker 234 near or as part of the device allows it to be quickly and accurately located and correctly positioned adjacent a user's ear.

When the handset 510 is in use as the user input/output portion 404 of the cellular telephone 400, it is physically separated from the wallet 500. When it is not in use, the handset 510 is attached to the wallet 510. The wallet 500 has on a portion of the front face of the rigid back portion 502 adjacent the cellular transceiver portion 402 a pair of retaining straps 520*a*, 520*b* for receiving and retaining the user input/output portion 404. The straps are 'V' shaped which corresponds to the V shaped layout of the keys on the keypad 408. The handset 510 is attached to the wallet by inserting it between the rigid back portion 502 and the retaining straps 520*a* and 520*b* so that the front face of the handset 510 is still exposed.

The rear face of the handset 510 carries connector 274. The portion of the wallet 500 behind the restraining strap 520*b* has the corresponding contact 258. The connectors 274 and 258 are brought into physical contact automatically and form a connection when the handset 510 is placed into position and held in position by the restraining straps 520*a* and 520*b*.

The rear face of the handset 510 may also carry connector 208 (if present). The portion of the wallet 500 behind the restraining strap 520*b* would have the corresponding contact 206. The connectors 206 and 208 are brought into physical contact and form a connection when the handset 510 is held in the wallet by the restraining straps 520*a* and 520*b*.

The cellular telephone 400 may optionally have an additional speaker and an additional microphone connected to audio processing circuit 232 in the cellular transceiver portion 402. The speaker and microphone in the cellular transceiver portion 402 may be suitable for hands/free use Thus in this embodiment, the handset 510 is not the sole or only means of audio input and output for the cellular telephone 400. There may be a user operable switch preferably provided via a displayed menu that allows the user to choose between whether the speakers and microphone combination of the handset 510 or the speaker and microphone combination of the cellular transceiver portion 402 is enabled. Thus the user may select whether the telephone operates with the speaker and microphone combination 234, 236 or with the transceiver portion's additional speaker and microphone combination. The user may select that the speaker and microphone combination are used when possible i.e. as a default, when the cellular transceiver portion 402 and the handset 404 are separated. However, there is preferably a detection mechanism that detects when the handset 504 and transceiver portion 402 are physically separated but are unable to communicate with each other via the LPRF circuits 260, 278. If such communication is not possible, the detection mechanism automatically allows the additional microphone and speaker combination to be used.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A cellular radio telephone having an audio input device and an audio output device with which a user can communicate in a cellular radio telephone network, comprising:

a cellular transceiver portion comprising cellular radio transceiver circuitry for communicating in the cellular radio telephone network and a first low power wireless transceiver, wherein the cellular transceiver portion is housed in an ornamental housing customized to a user's specification at manufacture; and a user input/output portion comprising the audio input device and the audio output device and a second low power wireless transceiver for communicating with the first low power wireless transceiver of the cellular transceiver portion, wherein the first and second low power wireless transceivers enable a user to communicate using the audio input and output devices in the cellular radio telephone network when the cellular transceiver portion and the user input/output portion are physically separated and wherein the user input/output portion is electrically charged via the cellular transceiver portion.

2. A cellular radio telephone having an audio input device and an audio output device with which a user can communicate in a cellular radio telephone network, comprising:

a cellular transceiver portion comprising cellular radio transceiver circuitry for communicating in the cellular radio telephone network and a first low power wireless transceiver; and a user input/output portion comprising the audio input device and the audio output device and a second low power wireless transceiver for communicating with the first low power wireless transceiver of the cellular transceiver portion, wherein the first and second low power wireless transceivers enable a user to communicate using the audio input and output devices in the cellular radio telephone network when the cellular transceiver portion and the user input/output portion are physically separated and wherein the user input/output portion is electrically charged via the cellular transceiver portion, wherein the user input/output portion is housed in an ornamental housing customised to a user's specification at manufacture.

* * * * *